(12) United States Patent
Fujisawa (10) Patent No.: US 7,596,258 B2
(45) Date of Patent: Sep. 29, 2009

(54) IMAGE PROCESSOR

(75) Inventor: Yasuko Fujisawa, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 841 days.

(21) Appl. No.: 10/976,915

(22) Filed: Nov. 1, 2004

(65) Prior Publication Data
US 2005/0100203 A1  May 12, 2005

(30) Foreign Application Priority Data
Nov. 10, 2003  (JP) ............................. 2003-379994

(51) Int. Cl.
*G06K 9/00* (2006.01)
(52) U.S. Cl. ...................... 382/131; 382/128; 128/659; 128/653.1; 345/1.1
(58) Field of Classification Search ................... 382/131
See application file for complete search history.

(56) References Cited

U.S. PATENT DOCUMENTS

| | | | | |
|---|---|---|---|---|
| 5,421,331 | A | * | 6/1995 | Devito et al. ................. 600/425 |
| 5,435,310 | A | * | 7/1995 | Sheehan et al. ............. 600/416 |
| 7,043,063 | B1 | * | 5/2006 | Noble et al. ................. 382/128 |
| 2002/0163481 | A1 | * | 11/2002 | Takamine ................... 345/1.1 |

FOREIGN PATENT DOCUMENTS

| | | | |
|---|---|---|---|
| JP | 6-203158 | | 7/1994 |
| JP | 06-203158 | * | 7/1994 |
| JP | 08-279033 | * | 10/1996 |
| JP | 8-279033 | | 10/1996 |

* cited by examiner

*Primary Examiner*—Samir A. Ahmed
*Assistant Examiner*—Tsung-Yin Tsai
(74) *Attorney, Agent, or Firm*—Oblon, Spivak, McClelland, Maier & Neustadt, L.L.P.

(57) ABSTRACT

An image processor according to the invention is provided with a storage that stores the volume data of a medical image including a chest of an examined body, a search range setting device that specifies a cardiac search range based upon an air region corresponding to a lung in a tomographic image acquired based upon the volume data, a ventricular cluster detector that detects a ventricular region from the cardiac search range, a long axis detector that detects the long axis of a ventricle from the detected ventricular region, a multiplanar reconstruction processor that generates plural sectional images perpendicular to the detected ventricular long axis based upon the volume data, a ventricular wall detector that detects the inner wall and the outer wall of the ventricle from each of the plural sectional images, a ventricle analyzer that analyzes the ventricle based upon the detected ventricular inner/outer walls and a controller that makes a series of processes from a process for limiting the range including the heart to a process for analyzing the ventricle automatically proceed according to an instruction to start automatic analysis.

9 Claims, 7 Drawing Sheets

SEARCH RANGE INCLUDING LEFT VENTRICULAR LUMEN AND CARDIAC MUSCLE

LEFT VENTRICULAR LONG AXIS

IMAGE PROCESSOR

CROSS-REFERENCE TO RELATED APPLICATIONS

This application is based upon and claims the benefit of priority from prior Japanese Patent Application No. 2003-379994, filed Nov. 10, 2003, the entire contents of which are incorporated herein by reference.

BACKGROUND OF THE INVENTION

1. Field of the Invention

The present invention relates to an image processor that performs cardiac analysis based upon volume data including an examined chest by X-ray CT.

2. Description of the Related Art

The acceleration of a helical scan and the development of a volume scan using a two-dimensional detector greatly changed the concept of an X-ray computed tomograph from a mere multiplanar imaging device to a volume imaging device. That is, the scan of the volume of an examined body at high speed with short temporal resolution was enabled by the X-ray computed tomograph provided with these scan modes. Together with the practical use of the X-ray computed tomograph provided with such a function, the use in many diagnostic fields unused so far is tried and movement to grope for a completely new diagnostic method is started. For one direction, there is the application to evaluative diagnosis related to a beat of the heart. As a volume scan substantially realizes that the whole heart is continuously scanned in a short cycle together with a segment scan mode, analysis related to the kinetic function of the heart such as the variation in time of the inner wall and the outer wall of a left ventricle and the variation in time of the thickness of a cardiac muscle is enabled.

One of the most important items that influence its precision in the analysis of the cardiac function is to precisely match a cross section to be analyzed with a direction perpendicular to the long axis of a left ventricle for example. It is to enhance precision in further extracting the inner wall and the outer wall of the left ventricle based upon the long axis of the left ventricle. Heretofore, an operator has made an effort to get skillful in these operations so as to enhance precision. The operator manually sets the long axis of the left ventricle and specifies a starting point of the trace of the inner wall and the outer wall of the left ventricle and a search range. Therefore, the workload of the operator increases and in addition, the result of analysis disperses depending upon an operator.

BRIEF SUMMARY OF THE INVENTION

An object of the invention is to reduce a load of an operator for analyzing the kinetic function of the heart and to enhance the reliability of the result of analysis.

A first aspect of the invention is provided with a storage that stores the volume data of a medical image including a chest of an examined body, a unit configured to specify a range including the heart as a cardiac search range based upon an air region corresponding to a lung in a tomographic image acquired based upon the volume data, a unit configured to detect a ventricular region in the specified cardiac search range, a unit configured to detect the long axis of a ventricle from the detected ventricular region, a unit configured to generate plural sectional images perpendicular to the detected ventricular long axis based upon the volume data, a unit configured to detect the inner wall and the outer wall of the ventricle based upon the plural sectional images and a unit configured to analyze the ventricle based upon the detected ventricular inner/outer walls.

A second aspect of the invention is provided with a storage that stores the volume data of a medical image including a chest of an examined body, a unit configured to detect the long axis of a ventricle from the volume data and a unit configured to analyze the ventricle using the detected ventricular long axis, and the unit configured to detect the long axis of the ventricle is provided with a unit configured to extract a ventricular region from each of multiplanar tomographic images of the volume data, a unit configured to approximate the extracted ventricular region to a three-dimensional ellipse and a unit configured to specify the long axis of the ellipse as the long axis of the ventricle.

A third aspect of the invention is provided with a storage that stores the volume data of a medical image including a chest of an examined body, a unit configured to detect the long axis of a ventricle from the volume data and a unit configured to analyze the ventricle using the detected ventricular long axis, and the a unit configured to detect the long axis of the ventricle is provided with a unit configured to specify a pair of air regions corresponding to right and left lungs based upon multiplanar tomographic images of the volume data, a unit configured to extract a ventricular region from a range between the specified pair of air regions and a unit configured to specify the long axis of the ventricle based upon the extracted ventricular region.

A fourth aspect of the invention is provided with a storage that stores the volume data of a medical image including a chest of an examined body, a unit configured to extract a ventricular region from the volume data, a unit configured to detect the long axis of a ventricle from the extracted ventricular region and a unit configured to analyze the ventricle using the detected ventricular long axis, and the a unit configured to extract the ventricular region is provided with a unit configured to specify a pair of air regions corresponding to right and left lungs based upon multiplanar tomographic images of the volume data, a unit configured to approximate the whole specified pair of air regions to an ellipse, a unit configured to couple the specified pair of air regions by processing including enlargement to be a single air region and a unit configured to extract the ventricular region from a region except the single air region from the elliptic region.

A fifth aspect of the invention is provided with a storage that stores the volume data of a medical image including a chest of an examined body, a unit configured to instruct to start automatic analysis related to the heart of the examined body, a unit configured to execute a series of processing from a process for detecting the long axis of a ventricle from the volume data according to the instruction to start the automatic analysis to a process for analyzing the ventricle based upon the detected ventricular long axis and a controller that controls the a unit configured to execute the series of processing so that the series of processing is automatically progressed.

A sixth aspect of the invention is provided with a storage that stores the volume data of a medical image including a chest of an examined body, input a unit configured to specify a range including the heart of the examined body in an axial direction of the body, a unit configured to extract a pair of air regions corresponding to right and left lungs from the range including the heart, a unit configured to approximate the whole pair of air regions to an ellipse, a unit configured to specify a cardiac search range by removing the pair of air regions from the elliptic region, a unit configured to detect a ventricular region from the specified cardiac search range, a unit configured to approximate the detected ventricular region to a three-dimensional ellipse and detecting the long axis of the three-dimensional ellipse as the long axis of the ventricle, a unit configured to generate plural sectional images perpendicular to the detected ventricular long axis based upon the volume data, a unit configured to detect the inner wall and the outer wall of the ventricle from the plural sectional images and a unit configured to analyze the ventricle based upon the detected ventricular inner/outer walls.

Additional objects and advantages of the invention will be set forth in the description which follows, and in part will be obvious from the description, or may be learned by the practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to the drawings, an embodiment of an image processor according to the invention will be described below. The image processor according to the invention is independent or is built in an X-ray computed tomograph or PACS. The image processor according to the invention will be described on the supposition that it is built in the X-ray computed tomograph below.

The X-ray computed tomograph has various types such as a rotary/rotary type in which an X-ray tube and a radiation detector are integrated and are rotated around an examined body and a fixed/rotary type in which multiple detecting elements are arrayed in the shape of a ring and only an X-ray tube is rotated around an examined body, and the image processor according to the invention can be applied to any type. The currently mainstream rotary/rotary type will be described below. To reconstruct tomographic image data of one slice, projection data for one round of the examined body, approximately 360° is required and even in a half scan mode, projection data for 180°+an angle of a view is required. The image processor according to the invention can be applied to any reconstruction mode. The former will be described as an example below. For a mechanism for transducing an incident X-ray to charge, an indirect transduction type in which an X-ray is transduced to light by a fluorescent substance such as a scintillator and further, the light is transduced to charge by a photoelectric transfer element such as a photodiode and a direct transduction type in which an electron-hole pair in a semiconductor is generated by an X-ray and is transferred to an electrode, that is, a photoconductive phenomenon is utilized are mainstream. For an X-ray detecting element, either type may be also adopted, however, the former indirect transduction type will be described below. Recently, a so-called multi-bulb type X-ray computed tomograph in which plural pairs one of which is composed of an X-ray tube and an X-ray detector are mounted on a rotary frame is being popularized and the development of its peripheral technique is accelerated. The image processor according to the invention can be applied to both a conventional type one-bulb type X-ray computed tomograph and the multi-bulb type X-ray computed tomograph. The one-bulb type will be described below.

Figure 1:
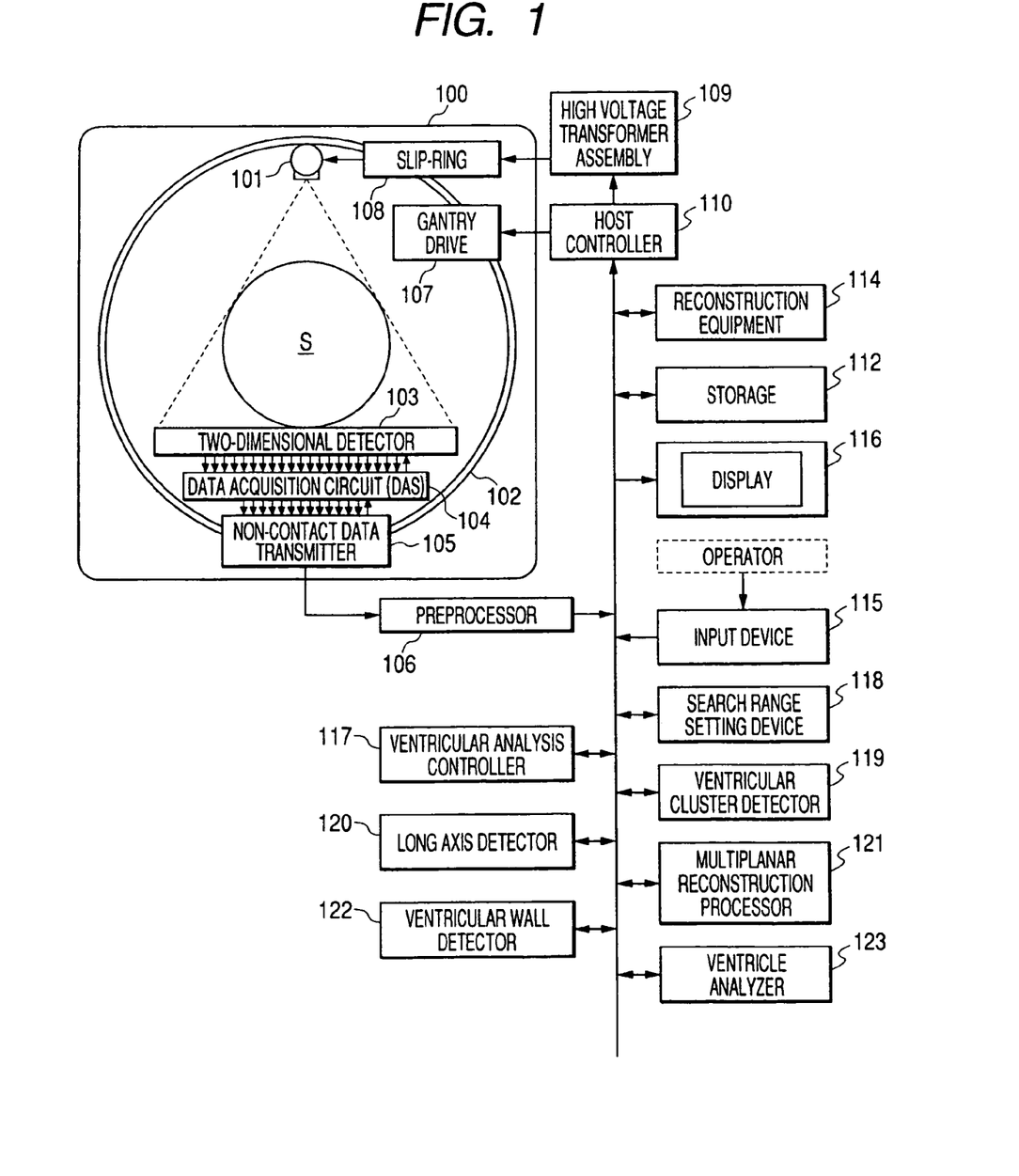
FIG. 1 is a block diagram showing an X-ray computed tomograph equivalent to a preferred embodiment of the invention.

FIG. 1 is a block diagram showing the configuration of an X-ray computed tomograph equivalent to this embodiment. A gantry 100 is provided with an annular rotary frame 102 rotated by a gantry drive 107. An X-ray tube 101 and an X-ray detector 103 are mounted in the rotary frame 102. The X-ray detector 103 is opposite to the X-ray tube 101 with a cavity (a tomographic area) S into which an examined body is inserted in tomography between them. High voltage generated continuously or periodically from a high voltage transformer assembly 109 is applied to the X-ray tube 101 via a slip-ring 108. Thereby, a cone-beam X-ray is generated. The X-ray detector 103 is provided with plural detecting elements. The plural detecting elements are arrayed in perpendicular two directions of a direction of a channel and a sliced direction. Such an X-ray detector 103 is generally called a multi slice type (a two-dimensional array type).

A data acquisition circuit 104 generally called a data acquisition system (DAS) is connected to the output terminal of the X-ray detector 103. In the data acquisition circuit 104, an I-V transducer that transduces a current signal of each channel of the X-ray detector 103 to voltage, an integrator that periodically integrates the voltage signal in synchronization with an exposure cycle of X rays, an amplifier that amplifies an output signal from the integrator and an analog-to-digital converter that converts an output signal from the preamplifier to a digital signal are provided every channel. A preprocessor 106 receives the output (a digital signal (called genuine data)) of the data acquisition circuit 104 via a non-contact type data transmission unit 105 that optically or magnetically realizes non-contact type data transmission and executes preprocessing such as corrects the ununiformity of sensitivity among channels for the genuine data and corrects the extreme deterioration of signal strength or the elimination of a signal by an X-ray strong absorber, mainly a metallic part. Data output from the preprocessor 106 is called raw data or projection data. The projection data is stored in an auxiliary storage 112 and is read by reconstruction equipment 114 under the control of a host controller 110. The reconstruction equipment 114 reconstructs image data related to a slice or volume based upon a set of projection data from the storage 112 according to the Feldkamp method or another reconstruction method. The image data is stored in the storage 112 and is displayed on a display 116 as a visible image.

In addition to the storage 112, the reconstruction equipment 114, the display 116 and an input device 115 provided with a keyboard and a pointing device respectively as basic components of an X-ray computed tomograph, a ventricular analysis controller 117, a search range setting device 118, a ventricular cluster detector 119, a long axis detector 120, a multiplanar reconstruction processor 121, a ventricular wall detector 122 and a ventricle analyzer 123 are connected to the host controller 110. The ventricular analysis controller 117 forms the image processor together with the storage 112, the display 116, the search range setting device 118, the ventricular cluster detector 119, the long axis detector 120, the multiplanar reconstruction processor 121, the ventricular wall detector 122 and the ventricle analyzer 123.

The functions of these components will be described together with image processing operation in this embodiment below. Before this operation, a contrast medium is gently injected into an examined body and the data of his/her chest including the heart of the examined body is acquired by a volume scan. Image data is reconstructed based upon the data acquired by the scan in the reconstruction equipment 114 in a multi slice mode or a volume mode and is stored in the storage 112. Multi slice data is a pixel set specified by a slice number and XY coordinates and in the meantime, volume data is a voxel set specified by XYZ coordinates. A pixel or a voxel is provided with a CT value corresponding to each X-ray absorption coefficient. In this embodiment, volume data will be described below.

Figure 2:
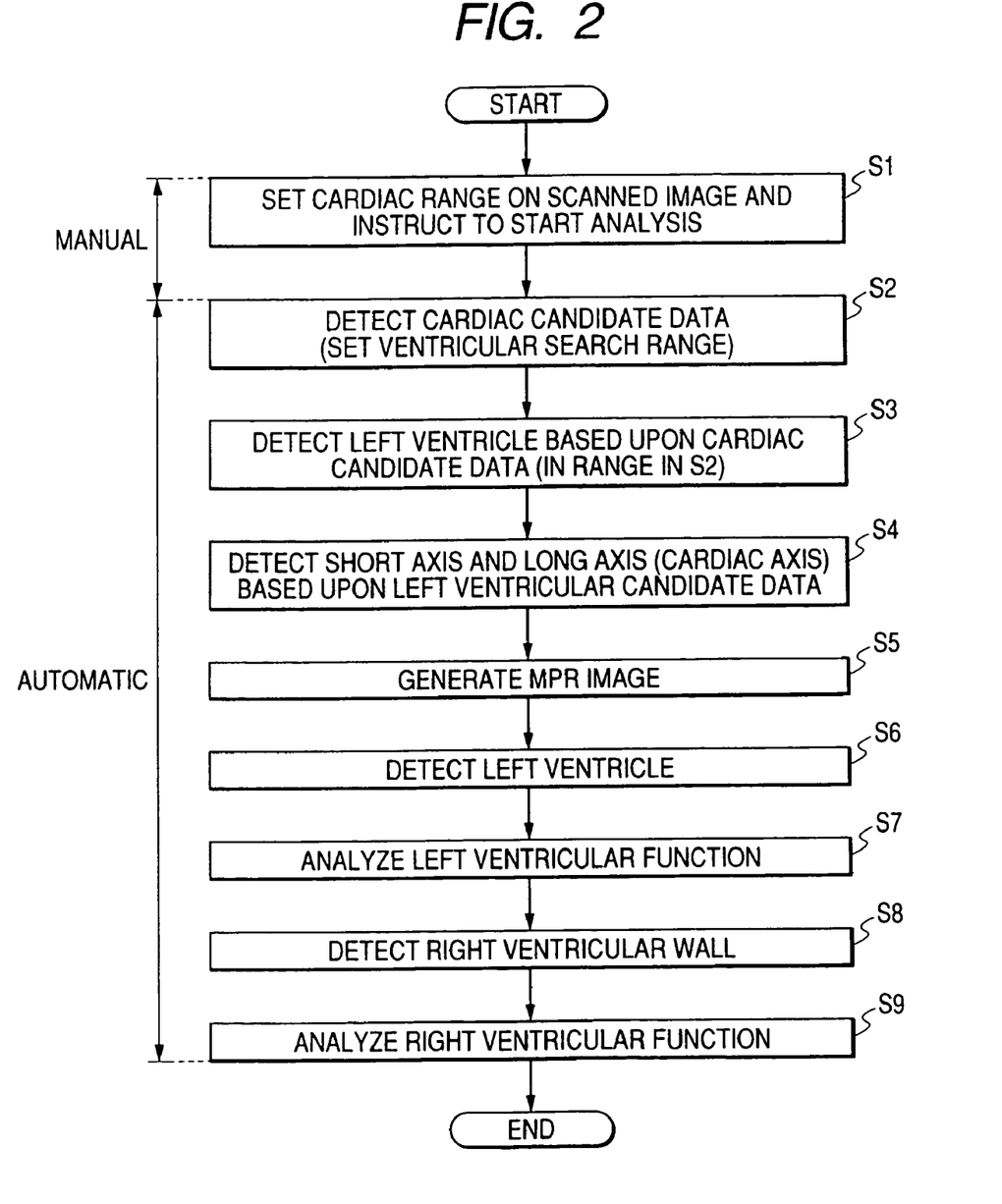
FIG. 2 shows an operational procedure in this embodiment.
Figure 3:
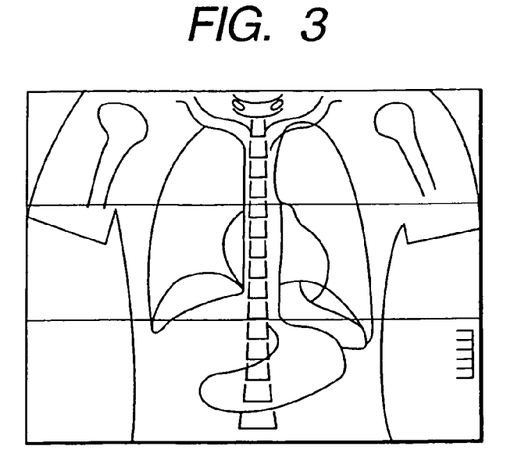
FIG. 3 is a drawing for supplementing S1 shown in FIG. 2.

FIG. 2 shows the flow of the image processing operation. First, a scanogram acquired at the stage of a scanning schedule or reconstructed based upon volume data is displayed on the display 116. As shown in FIG. 3, a range including the heart is designated on the scanogram in an axial direction of the body by the operation of the input device 115 by an operator (S1). An instruction to start a cardiac function analysis process is input at the same time.

According to the instruction to start the cardiac function analysis process, the ventricular analysis controller 117 controls the operation of each components 118 to 123 and the input/output of data between them according to a predetermined sequence so as to automatically progress a series of processes from a process for setting a range in which a left ventricle is searched in S2 described later to a final analysis process.

First, in the multiplanar reconstruction processor 121, plural tomographic images of XY planes related to volume data (planes perpendicular to a rotation axis) within the range including the heart are reconstructed at a predetermined interval based upon the volume data and are stored in the storage 112. The long axis of the left ventricle is set initially the tomographic images. In this embodiment, items for the operator to input for the analysis of the cardiac function are only the designation on these scanograms of the range including the heart and the instruction to start the cardiac function analysis process. The input work of the other items is not required.

Figure 4:
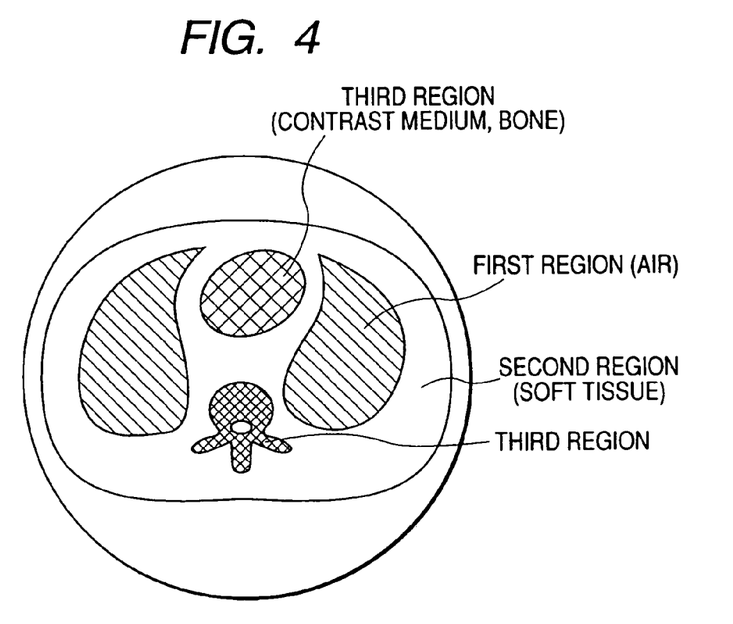
FIG. 4 is a drawing for supplementing a first step in S2 shown in FIG. 2.
Figure 5:
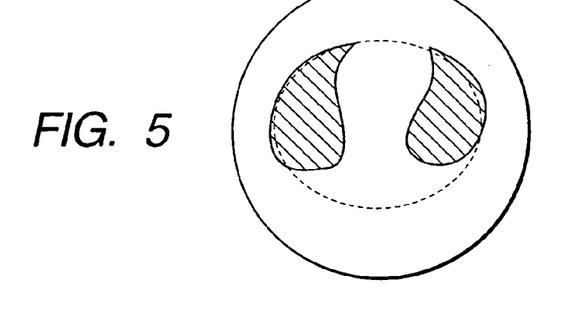
FIG. 5 is a drawing for supplementing a second step in S2 shown in FIG. 2.
Figure 6:
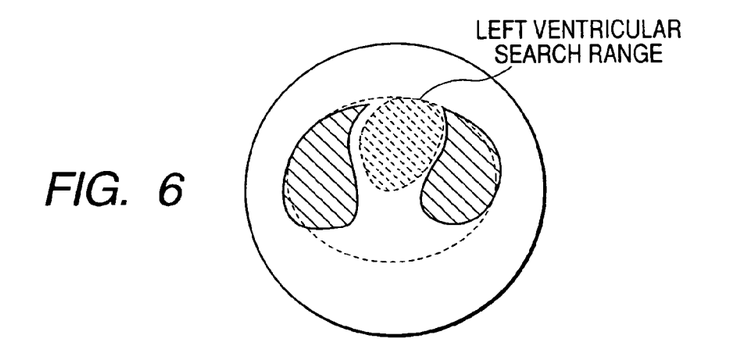
FIG. 6 is a drawing for supplementing a third step in S2 shown in FIG. 2.

As well-known, the cardiac function mainly means the contraction and the expansion of a myocardium. In its analysis, the function of the left ventricle for feeding blood to the whole body is important. To enhance the functional analysis precision of the left ventricle, it is important to define the long axis of the left ventricle and to reconstruct a tomographic image of a plane on a short axis perpendicular to the long axis. To set the long axis of the left ventricle, first, a region of the left ventricle is required to be searched from each tomographic image. When the area of the left ventricle is searched, it is effective to enhance the efficiency of work and the precision of the search to narrow a range of the search (S2). The search range setting device 118 classifies each tomographic image into three types of regions of an air region (a region having low CT values (for example, −1000 to 0), a soft tissue region (a region having intermediate CT value (for example, 0 to 300) and a contrasted blood and bone region (a region having high CT values (for example, 300 to 1000) by k-averaging for example as clustering as shown in FIG. 4 (converts each tomographic image to a three-value image classified according to CT values). Out of these three types of regions, a pair of air regions corresponding to right and left lungs are extracted. The extraction is executed by retrieving an object showing a value of air toward the center of the image from the periphery of the image. As shown in FIG. 5, a pair of extracted air regions are approximated to an ellipse. Simultaneously, the outside contour of a pair of air regions are coupled by the repetition of scaling for example and a single air region is formed. As shown in FIG. 6, a limited range including the heart, that is, a range in which the left ventricle is searched is set by removing the single air region from the approximated elliptic region. The range in which the left ventricle is searched may be also set by removing a pair of extracted air regions from the approximated elliptic region.

As described above, the air region can be easily extracted from the CT image without directly extracting a region of the heart from a tomographic image and in addition, the minimum range necessarily including the heart or a very limited range close to it can be set based upon the right and left lung regions in a tomographic image by utilizing an anatomical reason that the heart exists between the right and left lungs.

Figure 7:
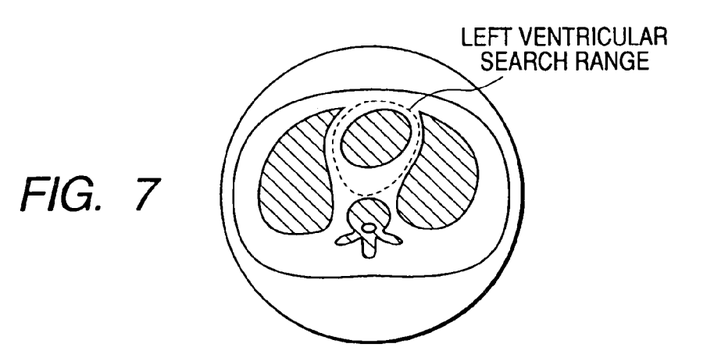
FIG. 7 is a drawing for supplementing S3 shown in FIG. 2.

As shown in FIG. 7, the ventricular cluster detector 119 detects a left ventricular cluster in the set left ventricular search range (S3). As the examination is contrast examination as described above, it is easy to extract pixels having a CT value of the contrast medium in the corresponding range. The pixels extracted in the left ventricular search range form two large clusters. One is a left ventricular cluster and the other is a right ventricular cluster. The left ventricular section is substantially circular and the right ventricular section is substantially crescent. The left ventricular cluster is specified based upon its contour.

Figure 8:
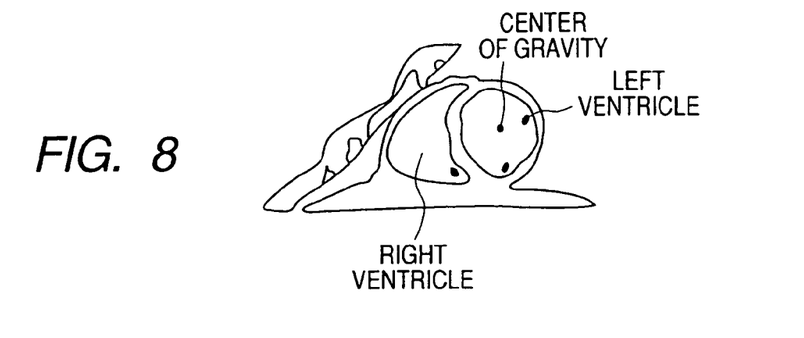
FIG. 8 shows a detailed image in a search range shown in FIG. 7.
Figure 9:
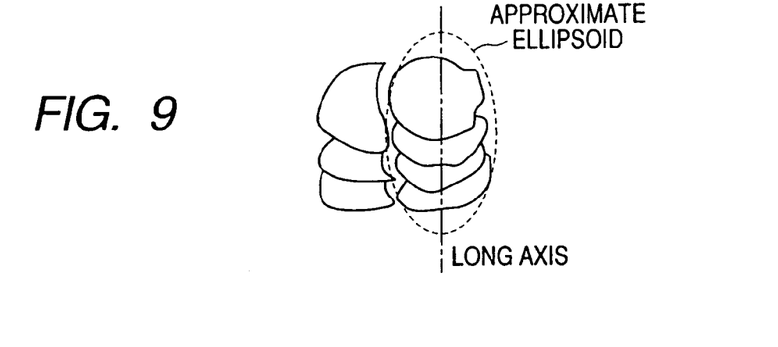
FIG. 9 is a drawing for supplementing S4 shown in FIG. 2.

The left ventricular cluster is specified from all tomographic images. The long axis detector 120 acquires the center of gravity of plural left ventricular clusters specified from plural tomographic images as shown in FIG. 8 and approximates to a solid ellipse like a rugby ball as shown in FIG. 9. The long axis of the ellipsoid is detected as the long axis of the left ventricle (S4).

As the long axis of the left ventricle can be automatically detected as described above, the workload of an operator can be greatly reduced, compared with that in the conventional method of manually specifying. A situation that the position and the direction of the long axis of the left ventricle disperse depending upon the experience and the knowledge of the operator can be also avoided.

Figure 10:
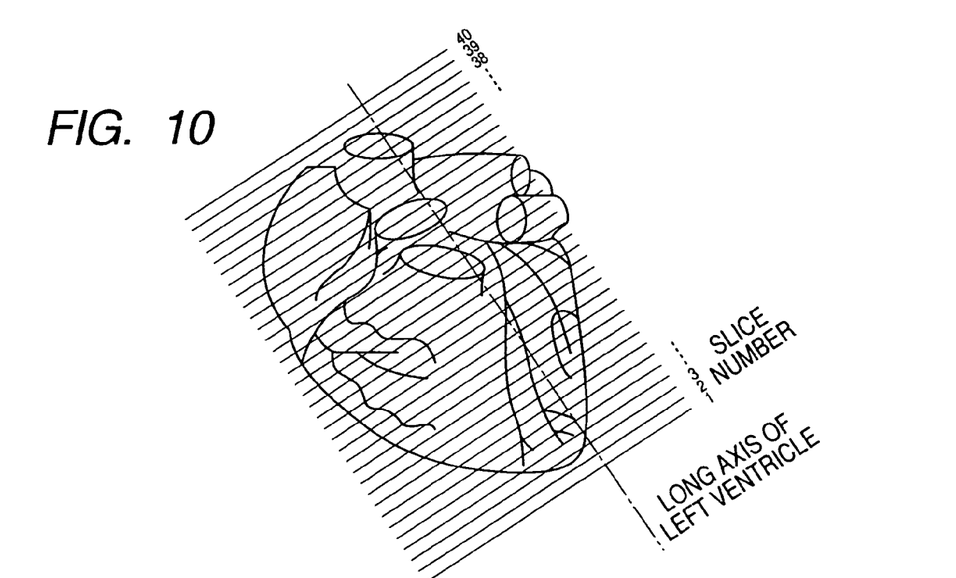
FIG. 10 is a drawing for supplementing S5 shown in FIG. 2.

When the long axis of the left ventricle is set, the multiplanar reconstruction processor 121 reconstructs plural tomographic images (called a short-axis image to discriminate it from the initial tomographic image) perpendicular to the set long axis of the left ventricle at a fixed interval as shown in FIG. 10 (S5). The analysis of a cardiac function is applied to such multiplanar short-axis images.

Figure 11:
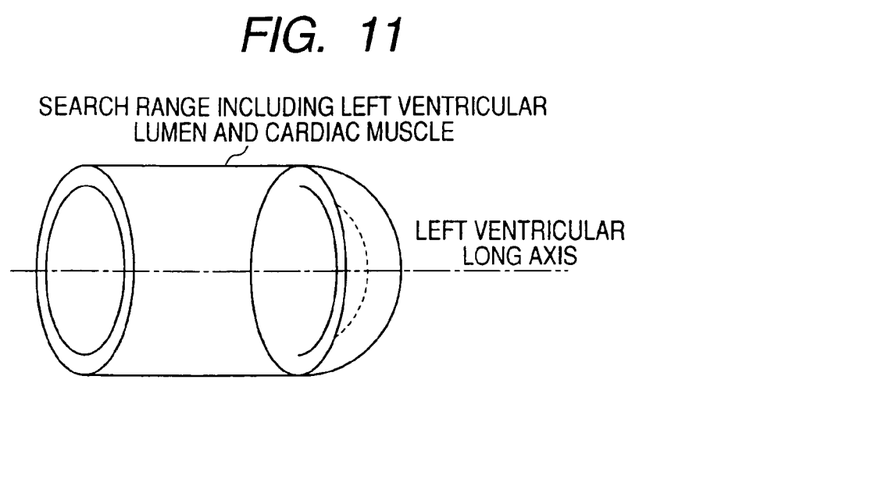
FIG. 11 is a drawing for supplementing S6 shown in FIG. 2.
Figure 12:
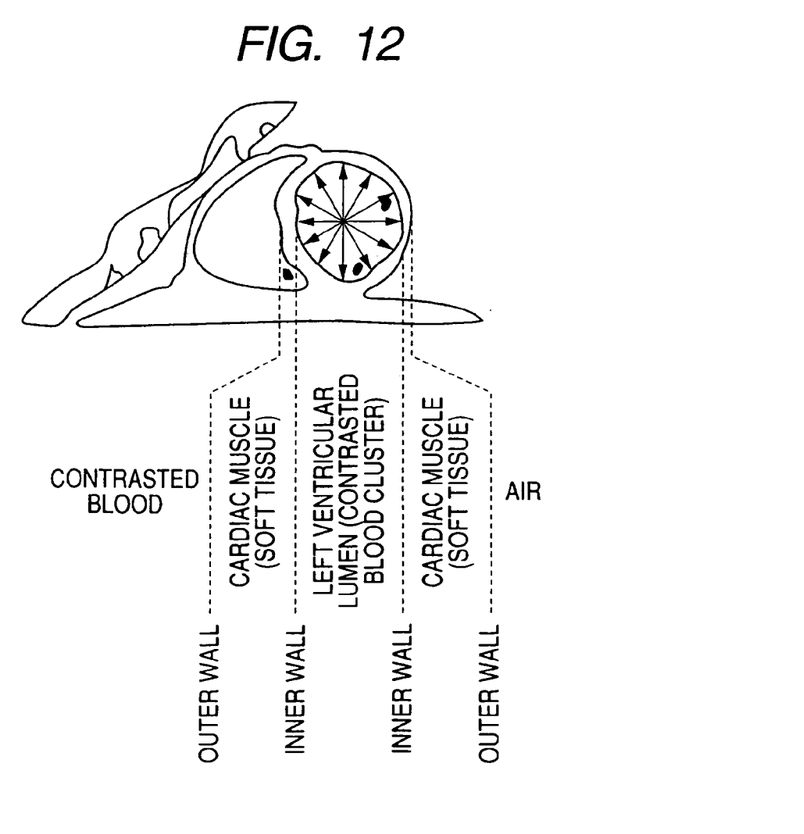
FIG. 12 is a drawing for supplementing S6 shown in FIG. 2.

For the initial stage of cardiac function analysis, the inner/outer walls of the left ventricle are generally detected (S6). First, the ventricular wall detector 122 converts each short-axis image to plural three-value images classified into the three regions of the air region, the soft tissue region and the contrasted blood and bone regions by k-averaging for example as clustering as described above. The ventricular wall detector detects the blood cluster of the left ventricle from each three-value image and sets a search range having a shape in which for example, a circular cylinder and a hemisphere are synthesized as a simple contour including the left ventricular cluster and shown in FIG. 11. For the limit of the search range, the ventricular wall detector 122 detects the inner wall and the outer wall of the left ventricle every short-axis image. For example, as shown in FIG. 12, the ventricular wall detector pursues a pixel value radially from the center of gravity of the left ventricular cluster and specifies a position in which the pixel value varies from a value corresponding to a contrasted blood vessel to a value corresponding to a soft tissue of a cardiac muscle as a point on the inner wall.

The inner wall of the cardiac muscle can be approximated to a polygon by connecting these specified points. Similarly, the ventricular wall detector pursues a pixel value radially from the center of gravity of the left ventricular cluster and specifies a position in which the pixel value varies from the value corresponding to the soft tissue of the cardiac muscle to a value corresponding to air or a value corresponding to contrasted blood as a point on the outer wall. The outer wall of the cardiac muscle can be approximated to a polygon by connecting these specified points. The ventricle analyzer 123 can calculate various indexes indicating the function of the left ventricle such as the variation in time of the thickness of the cardiac muscle of the left ventricle, the rate of the change, the inside volume of the left ventricle and the rate of the change using the inner wall and the outer wall of the left ventricle detected as described above (S7).

Also similarly for a right ventricle, a right ventricular cluster is specified from the contours of two blood clusters extracted by the ventricular cluster detector 119. The right ventricular cluster is specified from all tomographic images and the long axis detector 120 approximates it to a solid ellipsoid like a rugby ball. The long axis detector detects the long axis of the ellipsoid as the long axis of the right ventricle. A short-axis image of the right ventricle is reconstructed based upon the volume data of multiple planes perpendicular to the long axis of the right ventricle. The inner/outer walls of the right ventricle are detected from each short-axis image of the right ventricle as in S6 (S8). The ventricle analyzer 123 calculates various indexes indicating the function of the right ventricle such as the variation in time of the thickness of the cardiac muscle of the right ventricle, the rate of the change, the inside volume of the right ventricle and the rate of the change using the inner wall and the outer wall of the right ventricle detected as described above (S9).

The calculated results of the analysis of the function of the left ventricle and the right ventricle are displayed on the display 116 together with a short-axis image of the center for example of the left ventricle and a short-axis image of the center for example of the right ventricle under the control of the ventricular analysis controller 117.

Figure 13:
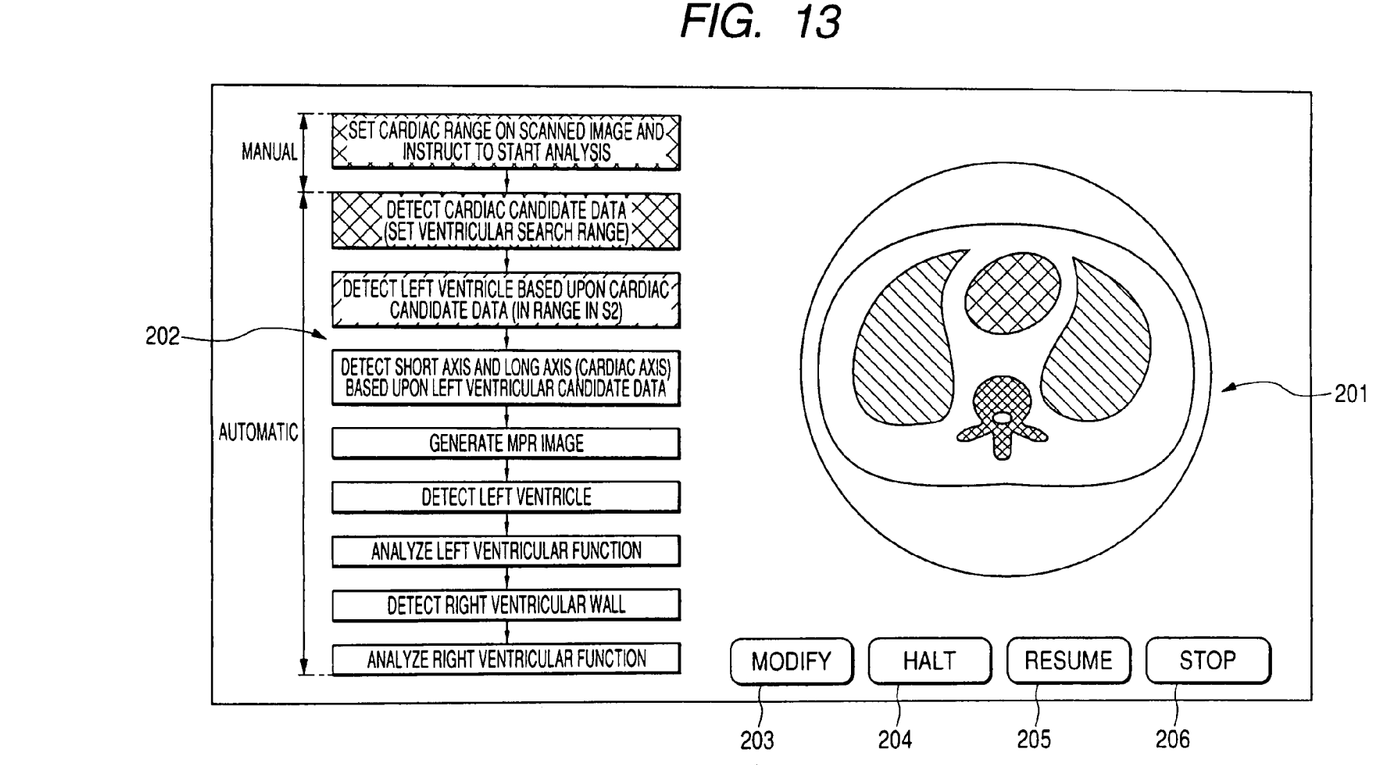
FIG. 13 shows one example of a screen displayed at the stage of S3 shown in FIG. 2 and showing the result of processing in S2.

Each processing result of the above-mentioned image processing steps S2 to S9 is sequentially displayed together with the proceedings of the processing under the control of the controller 117. As shown in FIG. 13, in the step S3 for example, the result 201 of the clustering in the preceding step S2 is displayed on the display 116. Together with the result 201 of the clustering, the flow 202 of the processing is displayed. A block of the steps in which processing is completed is displayed in a mesh pattern for example. A block of the steps in which processing is under way is displayed in a hatching pattern for example. A block of the unprocessed steps is displayed in a plain pattern. Together with the result 201 of the clustering and the flow 202 of the processing, four types of function buttons 203 to 206 inscribed as "modify", "halt", "resume" and "stop" are displayed.

When the "stop" button 206 is clicked during image processing, the corresponding image processing is stopped without storing the result of the processing till that time. When the "halt" button 204 is clicked during the image processing, the corresponding image processing is halted in a state in which the result of the processing till that time is stored. When the "stop" button is clicked, the image processing cannot be resumed. When the "halt" button is clicked, the image processing can be resumed from halted time.

When an arbitrary step box in the flow 202 of the processing is clicked after a halt, the result of the processing in the clicked step is displayed. When the "modify" button 203 is clicked at that stage, the result of the processing n the corresponding step is set to an object of modification. The operator operates the input device 115 to modify the result of the processing in the corresponding step. For example, a first region (see FIG. 4) related to air in the result 201 of the clustering is enlarged, reduced, transformed, rotated or moved. When desired modification is completed, the operator clicks the "resume" button 205. The image processing is resumed from the next step of the step corresponding to the modified result of the processing using the modified processing result. The operator can return the processing to the arbitrary step any time, can verify the result of the processing in the step and can modify the result of the processing if necessary.

According to this embodiment as described above, all processing including the most time-consuming setting of the ventricular long axis and further, the search of the inner/outer walls of the ventricle can be automated without via an operator except simple work for limiting a range of analysis in an axial direction of the body. Thereby, a workload of an operator is naturally reduced, further, the variation of the result of analysis caused by the dispersion in the position and the direction of the long axis of the left ventricle is inhibited, and the reliable result of analysis can be output.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processor, comprising:
   a storage that stores the volume data of a medical image including a chest of an examined body;
   a unit configured to specify a range including the heart based upon detecting an air region corresponding to the lungs in a tomographic image acquired based upon the volume data and extracting the detected air region from the acquired tomographic image so as to specify a cardiac search range;
   a unit configured to detect a ventricular region within the specified cardiac search range and to detect a left ventricular cluster and a right ventricular cluster based on specifying a circular contour of the left ventricular cluster and a crescent contour of the right ventricular cluster;
   a unit configured to detect the long axis of the ventricle in the detected ventricular region by acquiring a center of gravity of plural ventricle clusters from plural tomographic images to approximate an ellipsoid, the long axis of the ellipsoid being detected as the long axis of the ventricle;

a unit configured to generate plural sectional images perpendicular to the detected ventricular long axis based upon the volume data;

a unit configured to detect the inner wall and the outer wall of the ventricle from each of the plural sectional images; and a unit configured to analyze the ventricle based upon the detected ventricular inner wall and the outer wall.

2. An image processor according to claim 1, further comprising:

a unit configured to display the specified cardiac search range, the detected ventricular region and the detected long axis of the ventricle or the detected ventricular inner/outer walls together with the proceeding of processing.

3. An image processor according to claim 2, further comprising:

a unit configured to instruct the halt of the processing;

a unit configured to modify the specified cardiac search range, the detected ventricular region, the detected ventricular long axis or the detected ventricular inner wall and the outer wall according to operator's directions during the halt; and a unit configured to resume the halted processing from the modified cardiac search range, ventricular region, ventricular long axis or ventricular inner wall and the outer wall.

4. An image processor according to claim 1, further comprising:

a unit configured to display the flow of processes from a process for specifying the cardiac search range to a process for ventricular analysis.

5. An image processor according to claim 4, wherein:

in the flow of the processes, processes the processing of which is completed, a process during processing and unprocessed processes are displayed in a state in which they are visually discriminated.

6. An image processor according to claim 4, further comprising:

a unit configured to specify an arbitrary process in the flow of the processes; and a unit configured to display the result of processing in the specified process.

7. An image processor according to claim 5, wherein:

a processing halt button is displayed together with the flow of the processes.

8. An image processor according to claim 1, wherein:

the unit configured to detect the inner wall and the outer wall of the ventricle searches a pixel value radially from a point inside the ventricular region and detects the inner wall and the outer wall of the ventricle based upon the specific variation of the pixel value.

9. An image processor according to claim 1, wherein:

a series of processes from the process for specifying the cardiac search range to the process for the ventricular analysis are automatically executed.

* * * * *